UNITED STATES PATENT OFFICE.

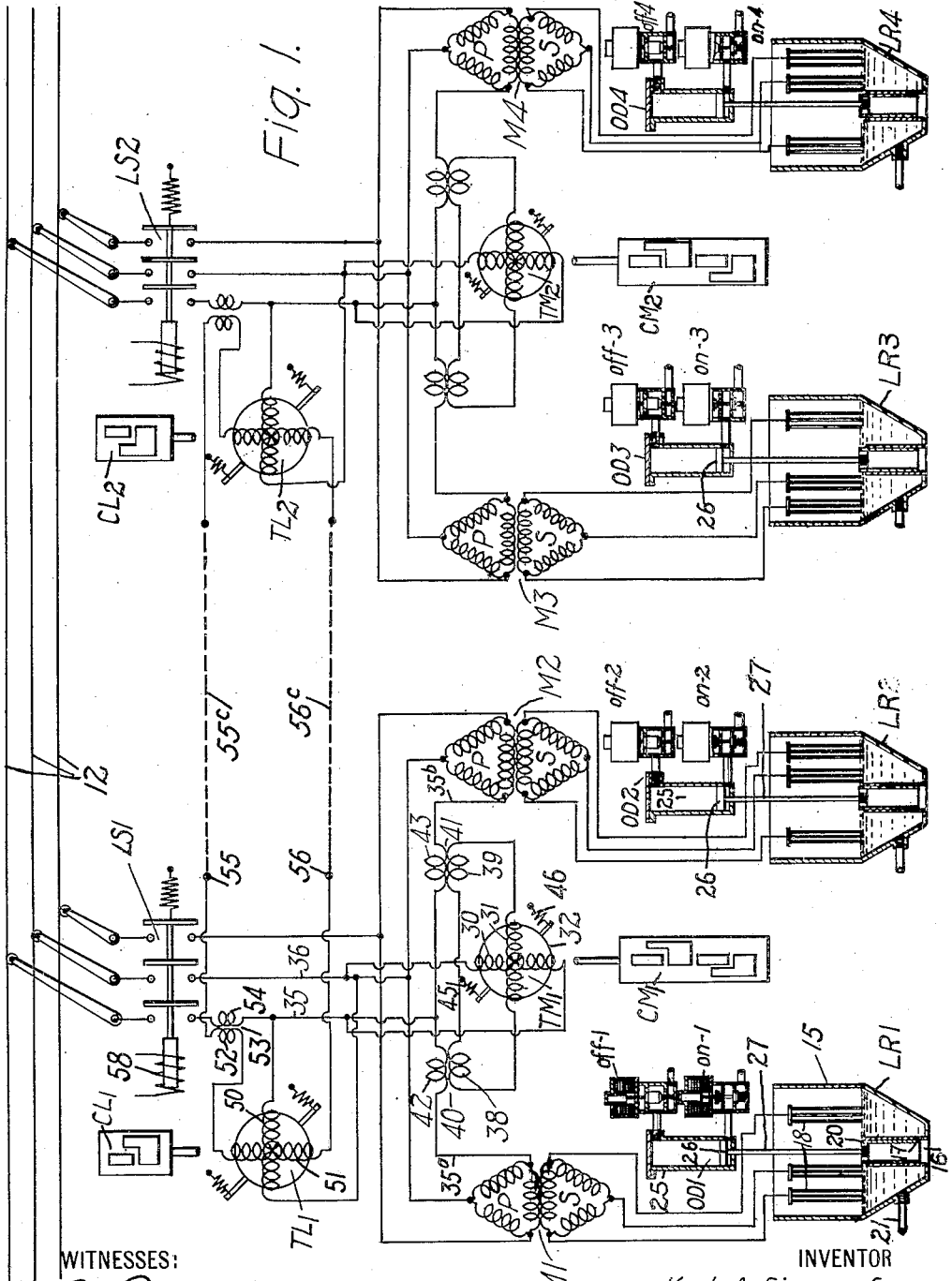

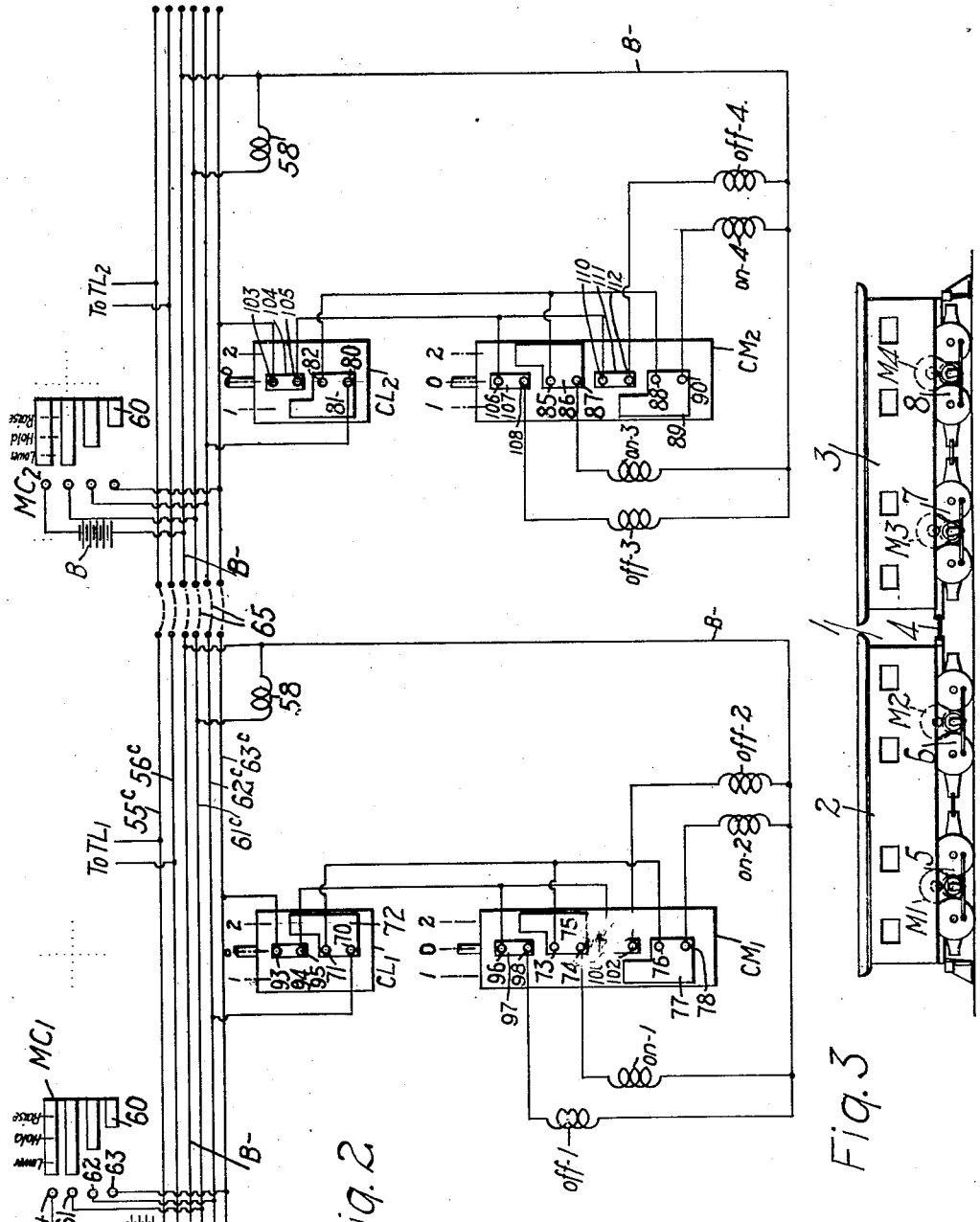

KARL A. SIMMON, OF EDGEWOOD PARK, AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,236,778.  Specification of Letters Patent.  Patented Aug. 14, 1917.

Application filed July 13, 1914. Serial No. 850,753.

*To all whom it may concern:*

Be it known that we, KARL A. SIMMON, a citizen of the United States, and a resident of Edgewood Park, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems for dynamo-electric machines that are employed for propelling electric locomotives or other electric vehicles, and it has special reference to the control of polyphase induction motors, the operation of which is governed by means of a plurality of electropneumatically operated liquid rheostats.

One of the objects of our invention is to provide a system of simple character for controlling the driving units or motors of an electric locomotive or train of electric vehicles in such manner that a predetermined division of the load between the driving units shall be maintained at all times, irrespective of variations in the mechanical construction and electrical characteristics of the several motors or their accessory governing apparatus, or differences in the diameters of the driving wheels.

Another object of our invention is to provide a control system of the above indicated class which shall be adapted for multiple unit operation and which shall automatically correct for the inherent differences in the operation of the various motors which may result from any cause whatsoever.

A further object of our invention is to provide adequate and reliable automatic means for proportioning the total load which is carried in common by a plurality of sets of driving motors, which means shall embody, first, means for balancing the loads between the motors of each set, and, second, which shall embody other means for balancing the loads between the several sets of driving motors.

In another aspect, one of the objects of our invention is to secure the desired division of load through the agency of electro-responsive devices which are adapted to respond to differences in the amounts of power taken by the several motors or sets of motors and which shall act under predetermined load conditions to reduce the load carried by the motor or set of motors which is relatively overloaded, and, concurrently, to increase the load carried by the remaining motor or set of motors which carries less than its proper share of the load.

More specifically, it is the object of our invention to provide torque operated controlling devices for automatically governing the several electro-pneumatically operated liquid rheostats associated with the several motors of a double unit locomotive, whereby the motors of the driving trucks of one unit of the locomotive shall divide their load in predetermined proportions, while the total load of the locomotive, as a whole, shall be balanced in predetermined proportions between the several locomotive half units. In case of a single locomotive unit having a pair of driving motors upon each of two trucks, the loads of the motors of each truck are properly divided, while the loads of the driving trucks, considered as units, are also proportioned.

With present day manufacturing methods, it is practically impossible to commercially construct motors and operating mechanisms therefor, which shall be identical with respect to electrical characteristics and operating qualities and, therefore, in electrically propelled vehicles of the types referred to, there is usually a tendency for certain of the motors to take a greater portion of the load than is intended.

Furthermore, when locomotives have been in service for considerable periods of time, the wear upon the driving wheels become so excessive that it is necessary to remove the wheels and turn them down to a smaller diameter. It may happen, therefore, that the wheels of a locomotive are not always of the same diameter, inasmuch as it is rarely that all of the wheels wear to the same degree and hence, only a portion of them have to be machined. Obviously, differences in the diameters of the driving wheels also effects differences in the motor operation with respect to the load carried thereby.

According to our invention, we propose to provide means for overcoming the difficulties just referred to and for securing the results hereinbefore enumerated.

In the accompanying drawing, Figure 1 is a diagrammatic view of the main circuit connections and apparatus of a system of control embodying our invention, certain of the auxiliary control accessories being indicated, although the control circuits thereof are omitted for the sake of clearness; Fig 2 is a diagrammatic view of the auxiliary control circuits which are associated with and are governed by certain of the apparatus shown in Fig. 1; and Fig. 3 is a diagrammatic view of a double unit electric locomotive provided with electric propelling motors that are adapted to be controlled by the system set forth in Figs. 1 and 2.

In order to comprehensively set forth our control system and its mode of operation, we shall first describe its general operation with respect to the main circuit connections, as shown in Fig. 1, and then describe the control circuit connections thereof and their respective functions.

Referring to Fig. 3, a locomotive 1 comprises a plurality of half units 2 and 3 that are conveniently associated by a suitable articulated link 4, the half unit 2 embodying a plurality of driving trucks 5 and 6, while the half unit 3 comprises driving trucks 7 and 8. The driving trucks 5 and 6 of the first half unit are respectively equipped with polyphase induction driving motors M1 and M2 and motors M3 and M4 are associated with the trucks 7 and 8, respectively.

Reference may now be had to Fig. 1 in which the system shown comprises a polyphase supply circuit 12 that is adapted to deliver energy to the driving motors M1, M2, M3 and M4 through a plurality of line switches LS1 and LS2 that are adapted to be electrically operated; a plurality of liquid rheostats LR1, LR2, LR3 and LR4 for respectively governing the operation of the respective motors M1, M2, M3 and M4; a plurality of operating devices termed "balanced pressure operating mechanisms" OD1, OD2, OD3 and OD4 for respectively actuating the several liquid rheostats, whereby the level of the electrolyte therein may be regulated, a plurality of torque devices $TM_1$ and $TM_2$, respectively associated with the sets of motors M1 and M2 and motors M3 and M4 and adapted to respond to differences in load between motors of each set; a plurality of controllers $CM_1$ and $CM_2$ respectively associated with the torque devices $TM_1$ and $TM_2$ for adjusting the circuit connections of the operating devices OD1 and OD2 and devices OD3 and OD4; a plurality of torque devices $TL_1$ and $TL_2$ respectively associated with the several locomotive half units 2 and 3 and responsive to relative load conditions thereof, and a plurality of controllers $CL_1$ and $CL_2$ for governing the circuit connections and operation of the several operating devices OD1, OD2, OD3 and OD4.

The motors M1, M2, M3 and M4 are of like construction and each embodies primary windings P and secondary windings S, which are conveniently connected in delta relation, the primary windings P being adapted to receive energy from the supply circuit 12 and the secondary windings S being connected to the respective liquid rheostats LR1, LR2, LR3 and LR4. The motors M1 and M2 are connected in multiple circuit and are supplied with energy through the line switch LS1, while the motors M3 and M4 are also connected in multiple and receive their energy through the line switch LS2.

The several liquid rheostats LR1, LR2, LR3 and LR4 embody like arrangements of parts and each comprises a tank 15 having a bottom discharge opening 16 and a centrally disposed tubular member 17 communicating therewith and projecting upwardly into the rheostat to a height corresponding to the lower ends of a plurality of electrodes 18. A tubular sliding regulatable valve 20 is disposed within the tubular member 17 and is adapted to be raised and lowered in position for determining the height of electrolyte which is continuously admitted into the rheostat tank 15 through an inlet port 21. The electrolyte normally establishes a "flush level" which corresponds to the upper end of the regulating valve 20, it being understood that the excess of electrolyte overflows and is disposed of through the bottom discharge opening 16.

In order to actuate the several regulating valves 20, the operating devices OD1, OD2, OD3 and OD4 are employed. Each of these devices comprises an operating cylinder 25, the upper end of which is provided with an electrically operated magnet valve marked "Off—1" (the numeral designating the rheostat with which the valve is associated), and the lower end is provided with another electrically operated magnet valve marked "On—1", or whatever numeral properly designates the associated rheostat.

The several "off" magnet valves, when deenergized, are biased to their open positions to admit a suitable operating fluid to the upper ends of the cylinders 25, while the "on" valve magnets, under similar conditions, serve to cut off the supply of operating fluid and to establish communication between the lower ends of the cylinders 25 to the atmosphere. The construction and mode of operation of these valves will not be described further inasmuch as they are common in the art. Each cylinder 25 is provided with a movable piston 26, the latter being connected to the regulating valve 20 of the corresponding rheostat by a rod 27, whereby said regulating valve 20 is raised and lowered in position in accordance with the movement of the piston 26.

The torque devices $TM_1$ and $TM_2$ may be of any well known construction for effecting rotative movements in opposite directions in accordance with the power conditions of the motor circuits, although we prefer to employ devices similar to that set forth in our co-pending application, Serial No. 843,929 and filed June 9, 1914. For illustrative purposes we have shown the various torque devices, as embodying a plurality of stationary coils 30 and 31 and a coöperating rotatable member 32 which is mechanically connected to the corresponding auxiliary controller $CM_1$ or $CM_2$, as the case may be. The coil 30 serves as the voltage coil of the device and is connected across two of the motor lead conductors 35 and 36, while the coil 31 is the series coil and is connected in a local series circuit which includes windings 38 and 39 of a plurality of series transformers 40 and 41, the primary windings 42 and 43 of which are respectively connected in series circuit with the motor lead conductors $35^a$ and $35^b$ that are respectively connected to the motors M1 and M2.

It is manifest, therefore, that when the loads carried by the several motors M1 and M2 are substantially equal, no current flows through the series winding 31 of the torque device $TM_1$, inasmuch as the series transformers 40 and 41 neutralize each other. In the event of a greater amount of power being taken by one motor than is used by the other, the action of one of the series transformers will over-balance that of the other and produce a current through the series coil 31 which will act in conjunction with the voltage coil 30 to produce a torque or rotative movement of the device $TM_1$ in one direction or the other, depending upon which motor is the most heavily loaded. The rotor 32 of the torque device $TM_1$ is normally maintained in a neutral position by means of a plurality of opposing springs 45 and 46, and is only moved therefrom when the torque developed is sufficient to overcome one or the other thereof.

The torque devices $TL_1$ and $TL_2$ are of like construction to those just described, and each embodies a voltage coil 50 that is connected across the motor lead conductors 35 and 36, and a series coil 51 which is connected in series circuit with a secondary winding 52 of a series transformer 53, the primary winding 54 of which is connected in series with the motor lead conductor 35. The circuit which includes the series coil 51 and the transformer secondary coil 52 terminates in contact terminals 55 and 56, and the corresponding terminals 55 and 56 associated with the several torque devices $TL_1$ and $TL_2$ are adapted to be interconnected by train line conductors or jumpers $55^c$ and $56^c$ under operating conditions when the two half units 2 and 3 of the locomotive 1 are operatively connected.

With this arrangement of apparatus, if the motors M1 and M2 of the locomotive half unit 2 carry more than their share of the total load, the several torque devices $TL_1$ and $TL_2$ will be rotated in one direction, while if the load conditions are reversed, the operation of said devices is in the opposite direction and, consequently, their associated controllers are correspondingly actuated.

The line switches $LS_1$ and $LS_2$ are severally of the three-pole type and are provided with operating electromagnets 58.

Reference may now be had to Fig. 2 in which a plurality of master controllers $MC_1$ and $MC_2$ of like construction are employed in connection with the control circuits of each of the locomotive half units, for manually governing the concurrent operation of the several operating devices OD1, OD2, OD3 and OD4, which respectively actuate the liquid rheostats LR1, LR2, LR3 and LR4.

Each of the master controllers MC comprises a movable conducting segment 60 and a plurality of stationary terminals B+, 61, 62 and 63 which are adapted to coöperatively engage the segment 60 along the position-indicating lines "lower," "hold" and "raise." The several contact terminals 61, 62 and 63 are respectively connected to train line conductors $61^c$, $62^c$ and $63^c$ and a plurality of auxiliary control batteries B have their negative terminals connected to a train line conductor B—. Corresponding train line conductors of the several locomotive half units are interconnected in the usual manner by means of suitable jumpers 65, whereby the system, as a whole, is adapted for multiple unit operation.

The energization of the several "off" and "on" electrically operated valves that are associated with the operating devices of rheostats LR1 and LR2 is governed by the torque operated controllers $CL_1$ and $CM_1$, while corresponding valves of the rheostats LR3 and LR4 have their energizing circuits interlocked through and adjusted by the torque actuated controllers $CL_2$ and $CM_2$. The controller $CM_1$ is adapted to adjust the circuit connections of the "off" and "on" valves of the locomotive unit 1 in accordance with the load conditions of its driving motors, whereby the load of said motors is properly proportioned, while the controller $CM_2$ similarly adjusts the division of load between the motors of the locomotive unit 2. Moreover, controllers $CL_1$ and $CL_2$ serve to shift the connections of the corresponding "off" and "on" magnet valves for equalizing the loads between the several locomotive half units 2 and 3.

Assuming the apparatus and the circuit connections to be as shown, the operation of the system is as follows: If it is desired to bring the several driving motors up to speed, one of the master controllers, for instance, controller MC₁, is moved into its "raise" position, thereby completing a circuit from the positive terminal of the battery B which includes contact terminals B+, conducting segment 60 contact terminal 61, conductor 61ᶜ, energizing coils 58 of line switches LS1 and LS2 and conductor B— to the other terminal of the battery. Having energized the closing magnets 58 of the several line switches LS1 and LS2, said switches are closed to supply energy from the supply circuit conductors 12 to the driving motors M1, M2, M3 and M4, which are connected in two sets in multiple relation. Another circuit is completed from terminal B+ which includes conducting segment 60, contact terminals 62 and conductor 62ᶜ where the circuit divides, one main branch including the following contact members of the controllers CL₁ and CM₁; terminal 70, segment 72 and terminal 71, where the branch again divides, one portion thereof traversing contact terminals 73 and 74 which are bridged by conducting segment 75, energizing coil of magnet valve "on—1" and conductor B— to the battery, while the other portion traverses contact terminal 76, conducting segment 77, contact trminal 78, energizing coil of magnet valve "on—2" and conductor B— to the battery. The other main branch includes contact terminal 80, conducting segment 81, contact terminal 82 where the circuit again divides, one portion of which traverses contact terminal 85, conducting segment 86, contact terminal 87, energizing coil of magnet valve "on—3" and conductor B— to the battery, and the other portion thereof traverses contact terminal 88, conducting segment 89, contact terminal 90, energizing coil of magnet valve "on—4" and conductor B— to the battery. Having completed the circuits just traced, the several "on" valve magnets are energized and are actuated into their open positions whereby operating fluid is admitted beneath the movable pistons 26 of the several operating devices OD1, OD2, OD3 and OD4. Balanced pressures acting upon the several pistons 26 are, therefore, obtained.

Still another circuit is established from contact terminal B+ which includes conducting segment 60, contact terminal 63 and conductor 63ᶜ where the circuit divides, one main branch including contact terminal 93, conducting segment 94, and contact terminal 95, where the circuit again divides, one portion thereof traversing contact terminal 96, conducting segment 97, contact terminal 98, energizing coil of magnet valve "off—1" and conductor B— to the battery, the other portion thereof traversing contact terminal 100, conducting segment 101, contact terminal 102, energizing coil of magnet valve "off—2" and conductor B— to the battery. The other main branch of the circuit under consideration, includes contact terminal 103, conducting segment 104, and contact terminal 105, where the circuit divides, one portion thereof traversing contact terminal 106, conducting segment 107, contact terminal 108, and energizing coil of magnet valve "off—3" to the battery, while the other portion thereof traverses contact terminal 110, conducting segment 111, contact terminal 112 and energizing coil of magnet valve "off—4" to the battery. The several "off" valve magnets are, therefore, energized and closed to the supply of operating fluid, while permitting the operating fluid in the upper ends of the several cylinders 25 to be released to the atmosphere.

Under these conditions, unbalanced pressure conditions obtain, and, by reason thereof, the several movable pistons 26 and their associated regulating valves 20 are raised in position concurrently. This action results in a corresponding rise in the level of the electrolyte within the several rheostats LR1, LR2, LR3 and LR4 and, consequently, the several driving motors M1, M2, M3 and M4 are concurrently started into operation. So long as the master controller MC₁ occupies its "raise" position, the secondary resistance of the several motors is gradually eliminated and said motors continue to accelerate, as will be understood.

When the desired speed of operation is attained, the master controller MC₁ is moved into its "hold" position, in which the conducting segment 60 thereof becomes disengaged from the conducting terminal 63, thereby interrupting the circuits of all of the "off" magnet valves and permitting said valves to be returned to their open positions, in which operating fluid is again admitted above the several pistons 26 and the upward movement of the regulating valves 20 is, therefore, arrested. Inasmuch as the pressures acting upon the several pistons 26 are then balanced, the regulating valves 20 are maintained in their respective positions and the motors operate at uniform speed.

In order to decrease the speed of the motors, it is only necessary to move the master controller MC₁ to its "lower" position, in which conducting segment 60 becomes disengaged from contact terminal 62 and the circuits of all of the "on" valve magnets are interrupted. The deënergization of the "on" valve magnets permits them to return to their closed position, whereby the lower ends of the several cylinders are opened to the atmosphere. Inasmuch as the upper ends of the cylinders are supplied with operating fluid, unbalanced pressures obtain and the several movable pistons 26, together with their associated regulating valves 20, are moved downwardly to effect a lowering of the electrolyte and a corresponding reduction in the motor speeds.

From the foregoing description, it is manifest that the motors may be accelerated, operated at any desired uniform speed, or may be retarded, at the will of the operator by manipulating the controller $MC_1$ to either its "raise", "hold" or "lower" position.

Having set forth the normal manually controlled operation of the system, we shall now consider the mode of operation of the automatic portion thereof which effects the predetermined proportioning of the loads with respect to the individual motors of each locomotive unit and with respect to several sets of motors of the respective locomotive units. For purposes of consideration, it will be assumed that the master controller $MC_1$ occupies its "raise" position and that the several operating devices OD1, OD2, OD3 and OD4 are concurrently performing their intended functions in raising their associated regulating valves 20, whereby the several motors are gradually accelerated. If, under these conditions, motor M1 has a tendency to carry a greater portion than its proper share of the load, irrespective of whether this tendency results from differences in mechanical construction or electrical characteristics of the motor, in the operation of its operating device OD1, or whether it be the result of differences in wheel diameters, the torque device $TM_1$ is brought into action in the following manner.

The excess of power taken by the motor M1 causes the current in the secondary winding 38 of the series transformer 40 to predominate over that in the winding 39 of the series transformer 41, whereby a torque is produced in the device $TM_1$ tending to rotate the controller $CM_1$ into its position 1, as shown in Fig. 2. In so doing, the several contact terminals 96, 98, 73 and 74 become disengaged from the cooperating conducting segments 97 and 75, whereby the valve magnets "off—1" and "on—1" are deënergized. Concurrently, contact terminal 100 becomes separated from conducting segment 101, while contact terminal 102 immediately is brought into engagement with conducting segment 77. Thus, the energizing circuits of valve magnets "on—2" and "off—2" are maintained closed, and, hence, the operation of the operating device OD2 continues as before, whereby the motor M2 is increased in speed, while the deënergization of the valve magnets "off—1" and "on—1" causes said valves to return to their normal position to establish unbalanced pressures acting upon the piston 26 of the operating device OD1, whereby said piston and associated regulating valve 20 are moved downwardly to decrease the speed of motor M1.

The motors M1 and M2 continue to operate in the manner described until their respective loads are again equalized, when the springs 45 and 46 of the torque device $TM_1$ return the controller $CM_1$ to its neutral or "0" position, after which the normal acceleration is resumed.

Without further description, it will be understood that similar adjustments of circuit connections and similar operations of the motors will be effected in case any of the other motors tend to carry more than its intended share of the load. By this means the load between any pair of motors of a single set is properly proportioned.

If, for any reason whatsoever, the motors M1 and M2 of the locomotive unit 2 tend to carry a greater portion of the load than the motors M3 and M4 of the other locomotive unit 3, the effect of the series transformer 53 which is traversed by the total current of the motors M1 and M2 predominates over that of the corresponding series transformer which is influenced by the total current of the motors M3 and M4 and, hence, the several torque devices $TL_1$ and $TL_2$ are rotated in corresponding directions by reason of the torque developed therein. The associated controllers $CL_1$ and $CL_2$, therefore, are moved into their positions 1 against the action of one of the opposing springs.

As the controller $CL_1$ is moved, its cooperating contact members become disengaged and hence the energizing circuits of the valve magnets "off—1," "on—1," "off—2" and "on—2" are interrupted and said valves, therefore, are returned to their normal positions. Thus, the operating devices OD1 and OD2 of the rheostats LR1 and LR2 are moved downwardly to effect concurrent speed reductions of the motors M1 and M2.

On the other hand, the controller $CL_2$, in moving into its position 1, transfers its control circuits in such manner as to maintain the energization of the several magnet valves "off—3," "on—3," "on—4" and "off—4," so that the normal acceleration of the motors M3 and M4 is undisturbed. Clearly, the reduction of load upon motors M1 and M2 and the increase thereof on motors M3 and M4 will then effect an equalization of the loads, after which the torque devices $TL_1$ and $TL_2$ are returned to their initial positions and the normal concurrent acceleration of all of the driving motors is resumed. Similar adjustments of circuit connections are, of course, effected in the event that the greater portion of the load is carried by the driving motors of locomotive unit 3, and no description thereof is deemed necessary.

In the system described, a plurality of torque devices $TL_1$ and $TL_2$ are employed for the reason that it is desired to make each set of control circuits for the several locomotive units a complete system, in order that any two half units may be operated in accordance with the usual multiple unit operation. It is evident that if particular locomotive half units are to be operated permanently together, only a single torque device $TL_1$ will be required for balancing the loads between the several half units, in which case, the contact members of both of the controllers $TL_1$ and $TL_2$ will necessarily be combined upon a single control drum. The arrangement of parts, circuit connections and the mode of operation, therefore will be comparable to that of either of the torque devices $TM_1$ or $TM_2$.

These and other modifications in the circuit connections and arrangement of control apparatus may be effected without departing from the spirit and scope of our invention, and all such modifications are intended to be covered by the appended claims.

We claim as our invention:

1. In a control system, the combination with a plurality of electric driving units adapted to work upon a common load, of means embodying a torque device responsive to power conditions upon said driving units and having a current winding and a potential winding for regulating the operation thereof.

2. In a control system, the combination with a plurality of electric driving units adapted to work upon a common load, of means embodying a torque device and having a current winding and a potential winding electrically associated with said driving units and influenced by the respective power loads for proportioning the load between the driving units.

3. In a control system, the combination with a plurality of electric driving units adapted to work upon a common load, of means embodying a torque device and having a current winding and a potential winding adapted to be mutually influenced by the several unit power loads for automatically controlling the operation of said units.

4. In a control system, the combination with a plurality of electric driving units adapted to work upon a common load, of means embodying a torque device and having a current winding and a potential winding responsive to mutual power conditions upon the several units, and control means governed thereby for controlling the operation of said units.

5. In a control system, the combination with a plurality of electric driving units adapted to work upon a common load, of means embodying a torque device responsive to mutual load conditions upon the several units, a control switch operated by said device, and electrically controlled means adapted to be governed by said control switch for controlling the operation of said units.

6. In a control system, the combination with a plurality of electric driving units adapted to work upon a common load, of means embodying a torque device responsive to mutual load conditions upon the several units, a controller actuated by said torque device, a plurality of liquid rheostats for severally governing said units and electropneumatic means governed by said controller for actuating said rheostats.

7. In a control system, the combination with a plurality of electric driving units adapted to work upon a common load, of means embodying a torque device having a voltage winding and a current winding, respectively influenced by the driving unit voltage and by the difference in driving unit currents and means for governing the operation of said units in accordance with the action of said torque device.

8. In a control system, the combination with a plurality of electric motors adapted to work upon a common load, of means embodying a torque device having a voltage winding and a current winding respectively influenced by motor voltage and by the difference in motor currents, and separate actuating mechanisms controlled by said torque device for governing the operation of said motors.

9. In a control system, the combination with a plurality of electric motors working upon a common load, and electrically controlled regulatable resistance devices for severally governing the operation of said motors, of a torque device responsive to differences in the loads upon said motors for reversing the action of the governing device of the motor taking the greater load.

10. In a control system, the combination with a plurality of electric motors working upon a common load, and a plurality of speed regulating devices severally associated with said motors and each comprising a regulatable rheostat, a pneumatic device for actuating said rheostat and a plurality of electrically operated valves associated with said pneumatic device, of a torque operated switching device responsive to differences in load upon the several motors for controlling the energization of said electrically operated valves.

11. In a control system, the combination with a plurality of sets of electric motors working upon a common load, of means for proportioning the load between said sets of motors, and means for proportioning the load between the motors of each set.

12. In a control system, the combination with a plurality of sets of electric motors working upon a common load, of means responsive to circuit conditions for effecting a predetermined division of load between said sets of motors, and other means for dividing the load between the motors of each set in predetermined proportions.

13. In a control system, the combination with a plurality of sets of electric motors working upon a common load, of means for dividing the load between said sets of motors and between the motors of each set in predetermined proportions.

14. In a control system, the combination with a plurality of sets of electric motors working upon a common load, of means embodying a torque device responsive to differences in load for proportioning the load between the motors of each set, and other means embodying torque apparatus responsive to differences in load between said sets for proportioning the load between the several sets of motors.

15. In a multiple unit control system, the combination with a plurality of sets of motors working upon a common load, separate speed governing apparatus for each motor and means for concurrently controlling the operation of said apparatus, of automatic means associated with each set of motors for proportioning the load between said motors of each set and automatic means associated with each set of motors and coöperating the one with the other and with the corresponding first mentioned automatic means for proportioning the loads between the several sets of motors.

16. In a control system, the combination with a plurality of sets of driving motors working upon a common load, a plurality of rheostats for said motors, and means for concurrently controlling the operation thereof under normal load conditions, of an electro-responsive controller for each set of motors for automatically controlling the operation of the associated rheostats and balancing the loads thereof, and other electro-responsive control apparatus associated with each set of motors for coöperating with the first mentioned controllers for automatically controlling the operation of the associated rheostats and balancing the loads between the several sets of motors.

17. In a control system, the combination with a plurality of electric driving units adapted to work upon a common load, of power-responsive means dependent upon mutual load conditions upon the several units, an auxiliary controller operated by said means, and electrically operated means adapted to be governed by said controller for controlling the operation of said units.

18. In a control system, the combination with a plurality of electric driving units adapted to work upon a common load, of power-responsive means dependent upon mutual load conditions upon the several units, an auxiliary controller actuated by said means, and a plurality of electro-pneumatically operated device governed by said controller for regulating the operation of said driving units.

19. In a control system, the combination with a plurality of electric motors working upon a common load, and electrically controlled regulatable resistance devices for severally governing the operation of said motors, of power-responsive means dependent upon the differences in the loads upon said motors for influencing the action solely of the governing device associated with the motor taking the greater load.

20. In a control system, the combination with a plurality of electric motors working upon a common load, and a plurality of speed regulating devices severally associated with said motors, and each comprising an electrically operated means for regulating the operation of its associated motor and embodying a plurality of electrically operated valves, of a torque-operated switch device responsive to differences in the power loads upon the several motors for controlling the action of said electrically operated valves.

21. In a control system, the combination with a plurality of sets of electric motors working upon a common load, of automatic means for dividing the load between the said sets of motors and automatic means for dividing the load between the motors of each set.

22. In a control system, the combination with a plurality of sets of electric motors working upon a common load, of automatic means for proportioning the load between said sets of motors and between the motors of each set.

23. In a multiple unit control system, the combination with a plurality of sets of motors working upon a common load, separate speed-governing apparatus for each motor, and means for concurrently controlling the operation of said apparatus, of automatic means associated with each set of motors for acting conjointly to proportion the loads between the motors of each set and to proportion the loads between the several sets of motors.

In testimony whereof, we have hereunto subscribed our names this 6th day of July, 1914.

KARL A. SIMMON.
ARTHUR J. HALL.

Witnesses:
D. H. MACE,
B. B. HINES.